US009044369B2

(12) United States Patent
Goldish et al.

(10) Patent No.: US 9,044,369 B2
(45) Date of Patent: Jun. 2, 2015

(54) MOBILE MANUAL STANDING WHEELCHAIR

(71) Applicant: The United States of America, as Represented by the Department of Veterans Affairs, Washington, DC (US)

(72) Inventors: Gary D. Goldish, Plymouth, MN (US); Andrew Hansen, Apple Valley, MN (US)

(73) Assignees: The United States of America, as Represented by the Department of Veterans Affairs, Washington, DC (US); Regards of the University of Minnesota, St. Paul, MN (US)

(*) Notice: Subject to any disclaimer, the term of this patent is extended or adjusted under 35 U.S.C. 154(b) by 0 days.

(21) Appl. No.: 13/644,139

(22) Filed: Oct. 3, 2012

(65) Prior Publication Data

US 2013/0113178 A1 May 9, 2013

Related U.S. Application Data

(60) Provisional application No. 61/555,620, filed on Nov. 4, 2011.

(51) Int. Cl.

| | |
|---|---|
| ***B62M 1/14*** | (2006.01) |
| ***A61G 5/14*** | (2006.01) |
| *A61G 5/02* | (2006.01) |
| *A61G 5/10* | (2006.01) |
| *A61G 5/12* | (2006.01) |

(52) U.S. Cl.

CPC . *A61G 5/14* (2013.01); *A61G 5/026* (2013.01); *A61G 2005/1051* (2013.01); *A61G 2005/128* (2013.01); *A61G 2200/56* (2013.01)

(58) Field of Classification Search

CPC .................... A61G 2005/1089; A61G 7/1046; A61G 1/0268; A61G 1/017

USPC ..................... 180/907; 280/250, 250.1, 304.1

See application file for complete search history.

(56) References Cited

U.S. PATENT DOCUMENTS

| | | | | | |
|---|---|---|---|---|---|
| 287,789 | A | * | 11/1883 | Arbogast | 280/211 |
| 2,181,420 | A | * | 11/1939 | Everest et al. | 280/250 |
| 2,847,058 | A | * | 8/1958 | Lee | 297/44 |

(Continued)

FOREIGN PATENT DOCUMENTS

JP 4583812 B2 11/2010

OTHER PUBLICATIONS

Churchward, R. "The development of a standing wheelchair", Applied Economics, Mar. 1985, vol. 16, Issue 1, Mechanical and Production Engineering Department, Royal Melbourne Institute of Technology, Melbourne, Australia.

*Primary Examiner* — Joseph Rocca
*Assistant Examiner* — Conan Duda
(74) *Attorney, Agent, or Firm* — Robert S. M. Gorman; Gorman Law Offices

(57) ABSTRACT

The present invention relates to a novel approach to improving the use of wheelchairs by offering the ability for the wheelchair to transition between accommodation for a seated position, and accommodation for a standing position, more particularly, wherein the inventive mobile manual standing wheelchair allows for a standing position during the course of mobile use, and which also permits fixed gearing of multiple speeds that also accommodates forwards and backwards motion.

10 Claims, 22 Drawing Sheets

(56) References Cited

U.S. PATENT DOCUMENTS

| | | | | |
|---|---|---|---|---|
| 4,380,343 | A * | 4/1983 | Lovell et al. | 280/250.1 |
| 4,598,944 | A * | 7/1986 | Meyer et al. | 297/183.9 |
| 4,625,984 | A * | 12/1986 | Kitrell | 280/250.1 |
| 4,685,693 | A * | 8/1987 | Vadjunec | 280/250.1 |
| 4,758,013 | A * | 7/1988 | Agrillo | 280/250.1 |
| 4,759,418 | A * | 7/1988 | Goldenfeld et al. | 180/65.1 |
| 4,766,772 | A * | 8/1988 | Tsuchie | 74/126 |
| 4,807,897 | A * | 2/1989 | Schultz | 280/250 |
| 5,037,120 | A * | 8/1991 | Parisi | 280/250.1 |
| 5,096,008 | A * | 3/1992 | Mankowski | 180/6.5 |
| 5,211,414 | A * | 5/1993 | Galumbeck | 280/250.1 |
| 5,346,280 | A * | 9/1994 | Deumite | 297/330 |
| 5,356,172 | A * | 10/1994 | Levy et al. | 280/650 |
| 5,366,036 | A * | 11/1994 | Perry | 180/65.1 |
| 5,401,044 | A * | 3/1995 | Galumbeck | 280/250.1 |
| 6,533,304 | B2 * | 3/2003 | Lizama-Troncoso et al. | 280/250.1 |
| 6,619,681 | B2 * | 9/2003 | Gutierrez | 280/250.1 |
| 6,851,751 | B1 * | 2/2005 | Romero et al. | 297/331 |
| 6,976,698 | B2 | 12/2005 | Kuiken | |
| 7,077,416 | B2 * | 7/2006 | Duarte | 280/304.1 |
| 7,165,778 | B2 | 1/2007 | Kuiken | |
| 7,708,093 | B1 * | 5/2010 | Baker | 180/65.1 |
| 7,784,815 | B2 | 8/2010 | Porcheron | |
| 7,815,209 | B2 | 10/2010 | Porcheron | |
| 7,845,665 | B2 * | 12/2010 | Borisoff | 280/250.1 |
| 7,900,945 | B1 * | 3/2011 | Rackley | 280/244 |
| 7,921,953 | B2 | 4/2011 | Irvine | |
| 8,403,352 | B2 * | 3/2013 | Hunziker | 280/304.1 |
| 2006/0097478 | A1 * | 5/2006 | Goertzen et al. | 280/304.1 |
| 2008/0111338 | A1 * | 5/2008 | Ilan | 280/250.1 |
| 2009/0174168 | A1 * | 7/2009 | Pavlopoulos et al. | 280/250.1 |
| 2010/0207353 | A1 * | 8/2010 | Hsu | 280/304.1 |
| 2011/0215540 | A1 * | 9/2011 | Hunziker et al. | 280/5.2 |
| 2011/0215547 | A1 * | 9/2011 | Davenport | 280/250.1 |

* cited by examiner

MOBILE MANUAL STANDING WHEELCHAIR

FIELD OF THE INVENTION

The present invention relates to a novel approach to improving the use of wheelchairs, by offering the ability for the wheelchair to transition between accommodation for a seated position, and accommodation for a standing position, wherein the manual standing wheelchair allows for a standing position while moving.

BACKGROUND OF THE INVENTION

Different types of standing wheelchairs are known in the art and often take the form of simple systems that elevate a user from a seated position to a semi-standing position when the wheel chair is stopped. It is, however, unknown in the art to provide a manual standing wheelchair that permits a user to enjoy the freedom of standing while moving the wheelchair. It is a further problem in the art to provide a wheelchair that is not only stable when moving while a user is in a standing position, but also to provide a wheelchair that offer the benefits of manual (rather than electric) propulsion, such as increased cardiovascular and muscular benefits, and independence from batteries and power sources. It is a further problem to provide such a manual propulsion system that maintains a relatively constant arm position for users as they propel the wheelchair along by grasping and pushing the rims of the side wheels of a wheel chair. It is yet another problem in the prior art to provide a standing wheelchair that provides a light weight, variable speed solution that can offer both seated and standing movement in the forward, reverse, and turning directions.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a novel approach to improving the use of manual standing wheelchairs, including offering the ability for the manual standing wheelchair to transition between accommodation for a seated position, and accommodation for a standing position. To this end, the inventive mobile manual standing wheelchair therefore allows for a standing position during the course of mobile use. Provision of such offers a way to decrease pressure sores on sitting surface tissues of a user, increase subjective bladder and bowel function, decrease osteoporosis of lower limb bones, decrease urinary tract infections, decrease spasticity, increase range of motion, and increase independence and quality of life. In addition, the inventive mobile manual standing wheelchair offers features which also make it advantageous for patients in that, unlike conventional standing wheelchairs, it is manual, rather than electric, and can offer the cardiovascular and muscle benefits of manual propulsion. In both the seated and standing positions, the inventive mobile manual standing wheelchair is therefore structured so as to permit usage of the user's hands along the rims of a set of large wheels on either side of the center structure, in such a way that the set of large wheels remains, in either the seated or standing position, approximately the same distance from and within the same alignment as the users shoulders so that the positioning of the arms need not be altered much.

Thus, in affording the above, the present invention provides for the following beneficial advances relating to: (1) Provision of a uniquely shaped design that utilizes a four-bar linkage system in which the back support section, seat support section, and lower extremity support section all comprise three of the four links, with the fourth link being an anti-rotation link which is equal in length and parallel to the seat bottom link, an arrangement that maintains the orientation of the back support section with the lower extremity support section; (2) Provision of a simple transition between sitting and standing through the additional usage of an actuator such as gas pistons or the like; (3) Provision of a novel linkage system maintains the same orientation of the trunk of the user (e.g., both user propulsion wheels are connected proximate to the back support section so as to maintain their general positioning with respect to the users' shoulders); (4) Provision of a drive system connection between the user propulsion wheels and the ground drive wheels using a three belt (per side) system that allows the user to manually operate the wheelchair while in either a sitting or standing position, or alternatively, provision of a simpler two belt (per side) system, albeit with less adjustability; (5) Provision of a multiple speed fixed-gear (e.g., non free-wheel like) hubs designed for bicycles for connections to the ground drive wheels that provides direct couplings between the user propulsion wheels and the hub, and forward and reverse cranking (propulsion) therewith so that propulsion wheels may be used for both forward and reverse propulsion, as well as rotation (e.g., turning); (6) Provision of optional low-noise belts, instead of chains as part of the drive system; (7) Provision of a drive system that allows for (i) standard wheelchair gearing (e.g., such as a 1:1 ratio of arc lengths of wheel rim to drive wheel), (ii) slower gearing that is available for ascending inclined surface areas, and (iii) faster gearing that is available to allow faster propulsion in the seated position. To this end, the present invention overcomes the aforementioned and other disadvantages inherent in the prior art. Other objects and advantages of the present invention will be more readily apparent from the following detailed description when read in conjunction with the accompanying drawings.

DETAILED DESCRIPTION OF THE INVENTION

Figure 1:
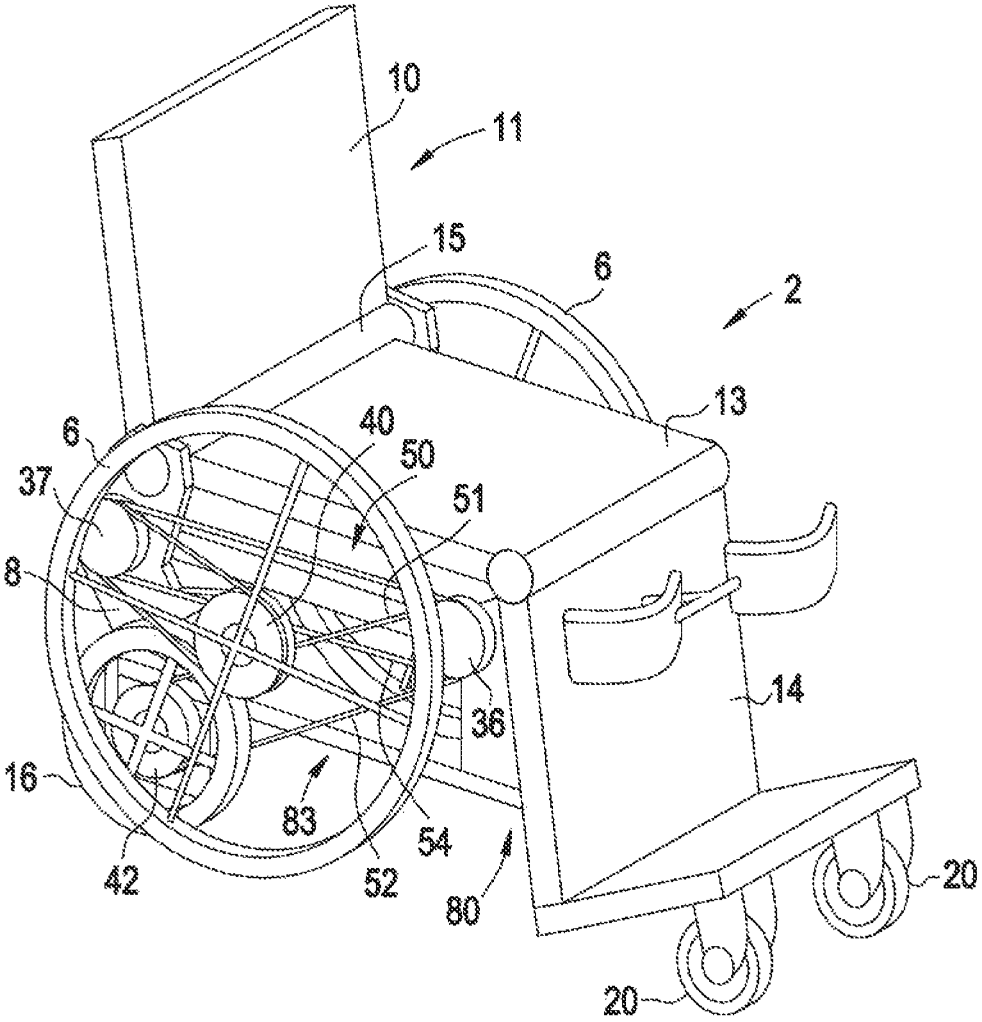
FIG. 1 is an offset view of one embodiment (having two independent intermediate drums) of the standing wheelchair when retracted in the (fully) seated position according to the present invention.
Figure 2:
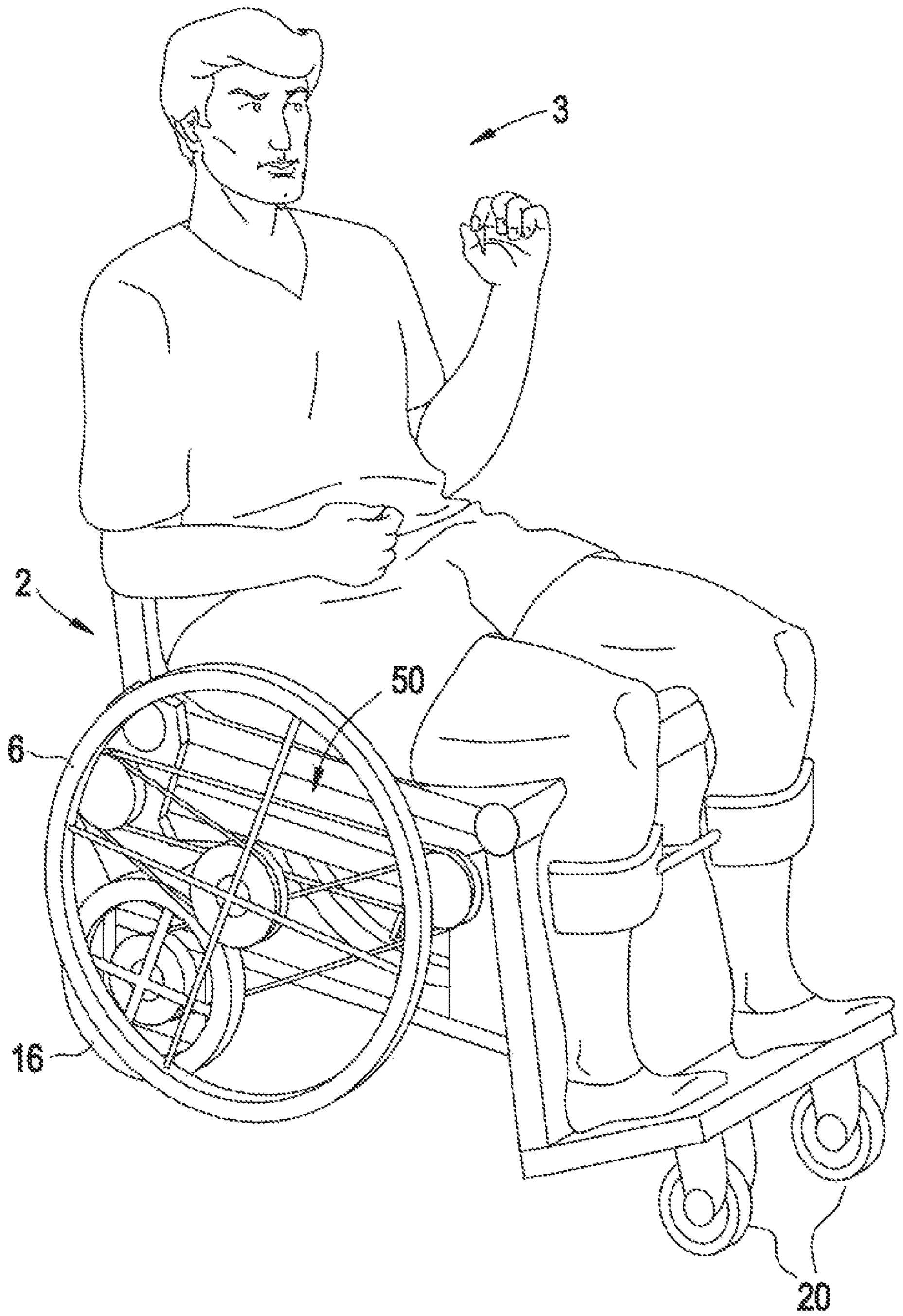
FIG. 2 is an offset view of one embodiment (having two independent intermediate drums) of the standing wheelchair when retracted in the (fully) seated position according to the present invention, with a user illustratively seated thereon.
Figure 3:
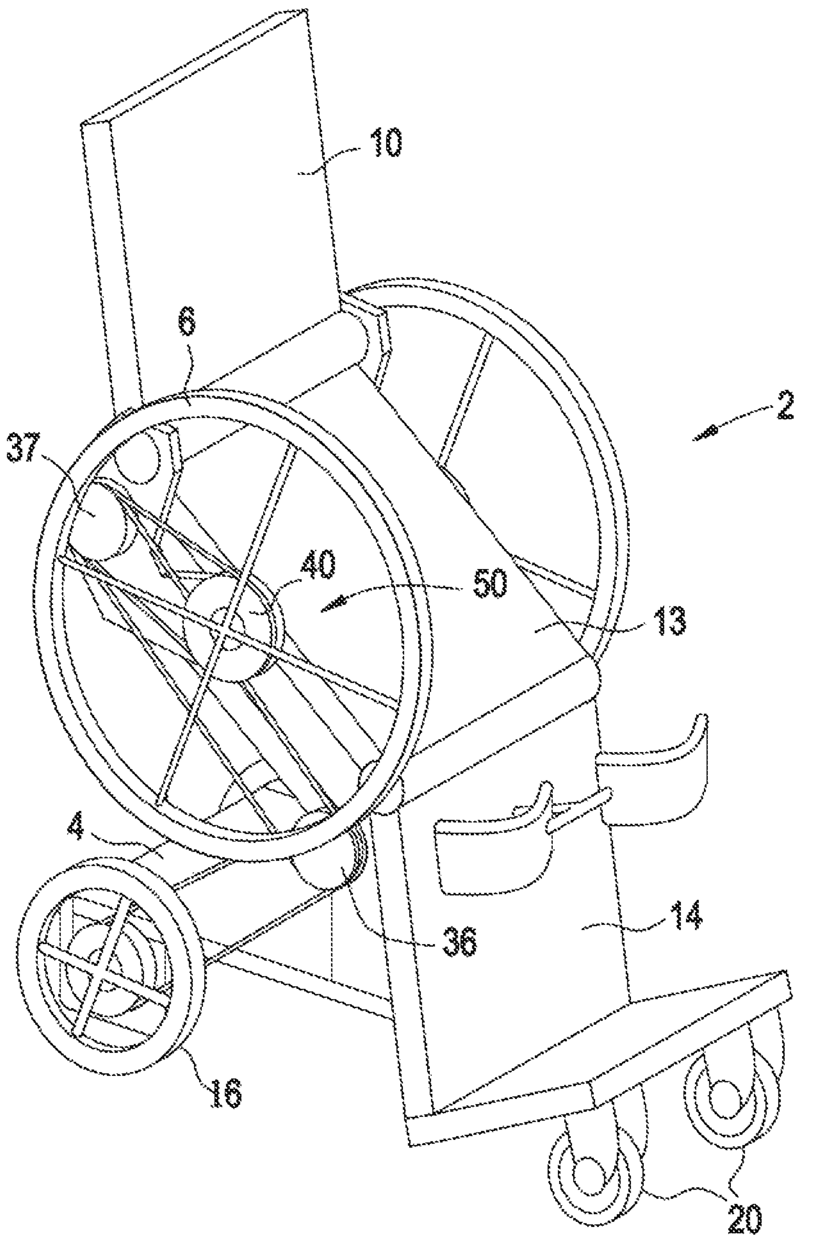
FIG. 3 is an offset view of one embodiment (having two independent intermediate drums) of the standing wheelchair when partially extended between the seated and standing positions according to the present invention.
Figure 4:
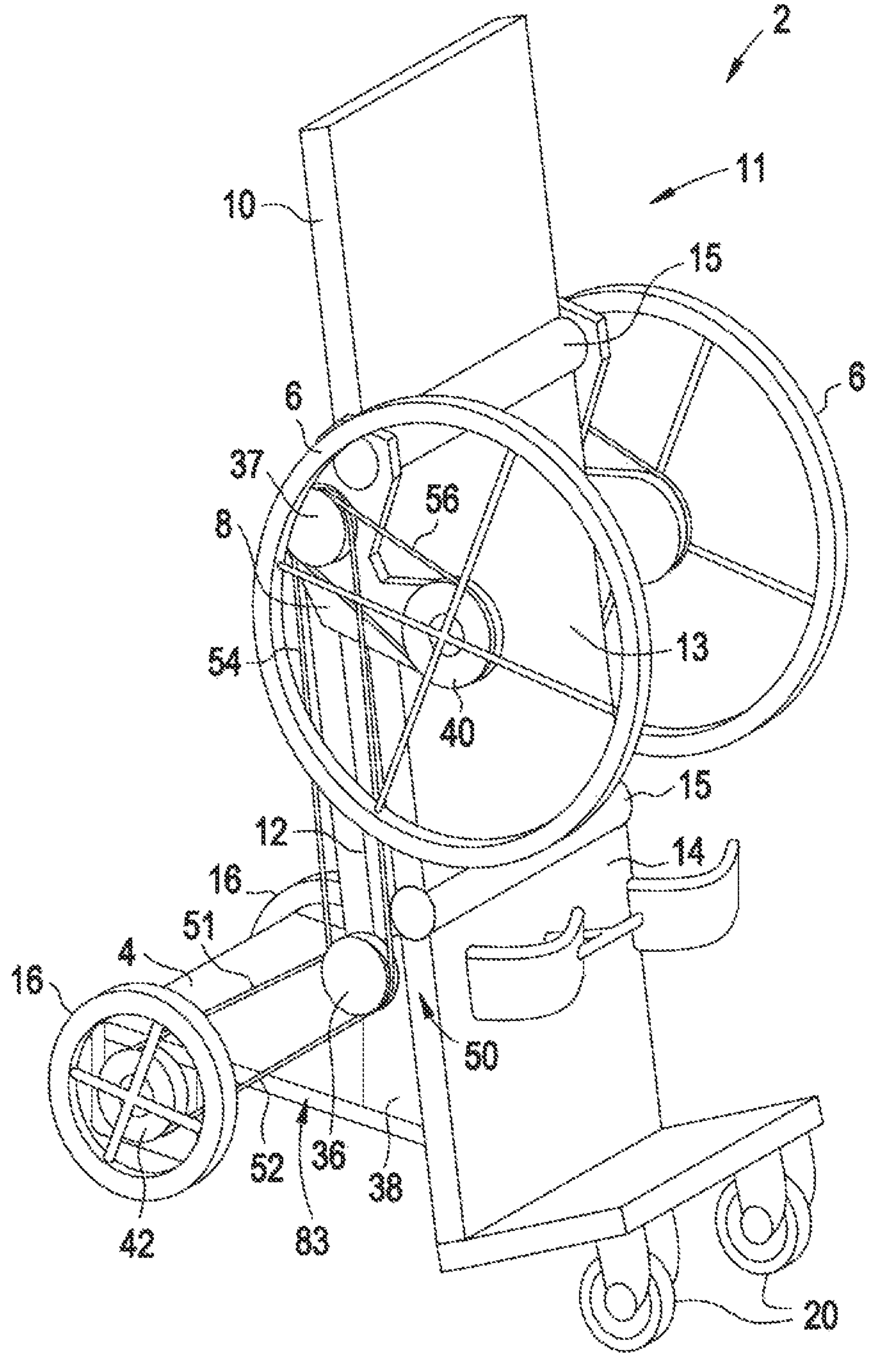
FIG. 4 is an offset view of one embodiment (having two independent intermediate drums) of the standing wheelchair when fully extended in the standing position according to the present invention.

At its broadest level, and as generally depicted in FIGS. 1-5, and with particular reference to illustrative FIG. 4, the present invention is directed to a standing wheelchair 2 that comprises: chassis 4 having a front portion 80, a rear portion 81, a left portion 82, a right portion 83, a center portion 84, a top portion 85, and a bottom portion 86; a lower extremity support structure 14 affixed in a substantially vertical fashion at the front portion of chassis 4; frontal directional support wheels 20 movably affixed (and rotably affixed through use of caster-type wheels in one embodiment) at a bottom of the lower extremity support structure; convertible user support section 11 affixed to the top portion of chassis 4 with an optional support bracket 38, wherein. convertible user support section 11 comprises at least seat support section 13 and back support section 10, such that seat support section 13 and back support section 10 are hingably connected together at 15; adjustment actuator 30 for raising and lowering convertible user support section 11 between a seated position and a standing position and any intermediate positions therebetween, wherein, in one embodiment, adjustment actuator 30 has a bottom end and atop end, and is hingably affixed at its bottom end to the top portion of chassis 4, and is hingably affixed at its top end to convertible user support section 11; user propulsion wheel support structure 8 (also termed a "bracket" herein) affixed to convertible user support section 11; drive system 50 having a matching left side drive system and a matching right side drive system, the left side drive system being functionally situated on the left side of chassis 4 and aright side drive system being functionally situated on the right side of chassis 4; wherein the left side drive system and the matching right side drive system each have a corresponding multiplicity of wheels comprising at least a ground drive wheel 16 with a concentrically mounted ground drive drum 42 therewith, the ground drive wheel being rotably affixed to chassis 4, and user propulsion Wheel 6 with a concentrically mounted propulsion drum 40 therewith, user propulsion wheel 6 being rotably affixed, in one embodiment, to propulsion wheel support structure 8; the lefi side drive system and the matching right side drive system of the drive system each further having a corresponding a drive linkage system 52 having at least one independent intermediate drum 36 (or alternatively, a second intermediate drum 37 where two intermediate drums are utilized) for providing a rotable hub(s) between concentrically mounted ground drive drum 42 of ground drive Wheel 16 and concentrically mounted propulsion drum 40 of user propulsion wheel 6, and links 51, 54 for connecting the aforementioned multiplicity of wheels of the Wheel system via the at least one independent intermediate drum 36, 37 together in a cooperative drive fashion; wherein the drive system is configured so that user propulsion wheel 6 is maintained in a position so as to be a relatively constant access position for a user when propelling wheelchair 2; and a bi-directional fixed hub system 60 (having a bi-directional, multi-gear hub 62 and switching means 64, not explicitly depicted in FIGS. 1-5, concentrically mounted on propulsion drum 40, for engaging the drive system 50 at one of several predetermined gear ratios, the bi-directional fixed hub system having a user switching means for transitioning between several predetermined gear ratios. In one embodiment, the independent intermediate drum comprises two independent intermediate drums, which may be chosen from the group comprising toothed sprockets. toothed pulleys, flat pulleys, grooved pulleys, flanged pulleys or crowned pulleys, while the links for connecting the multiplicity of wheels via the at least one independent intermediate drum together in a cooperative drive fashion are chosen from the group comprising chains, smooth sheaved belts, or toothed belts.

Figure 6A:
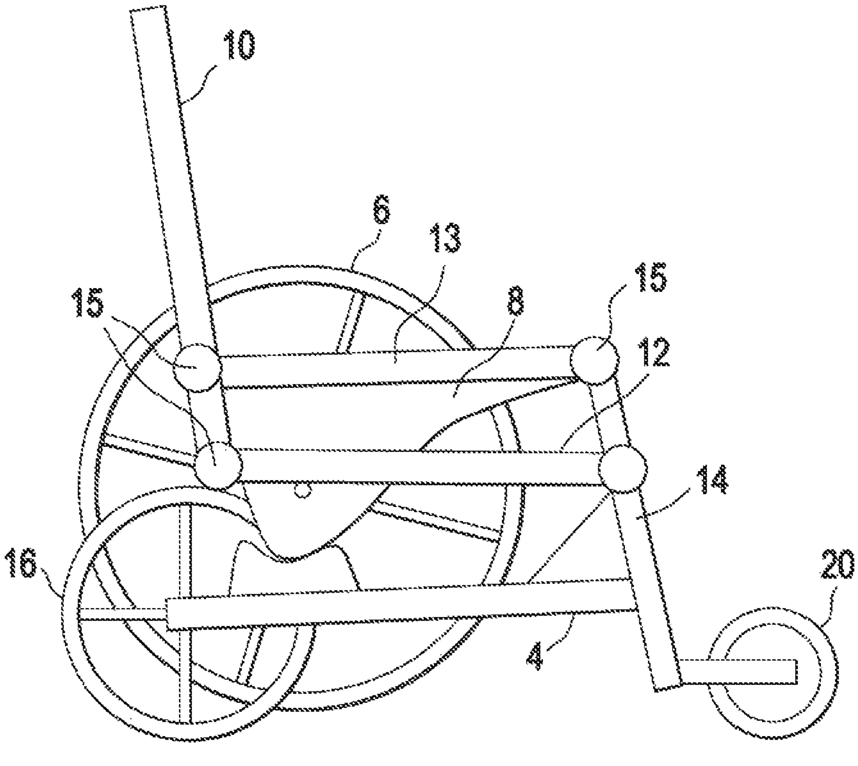
FIGS. 6A-6C is a side view of one embodiment (showing only one-half or one side of the multiplicity of wheels and associated support structure thereof) of the standing wheelchair with one version of the ground drive wheel, anti-rotation link or linkage bar, and user propulsion wheel support structure, across various positions according to the present invention.
Figure 6B:
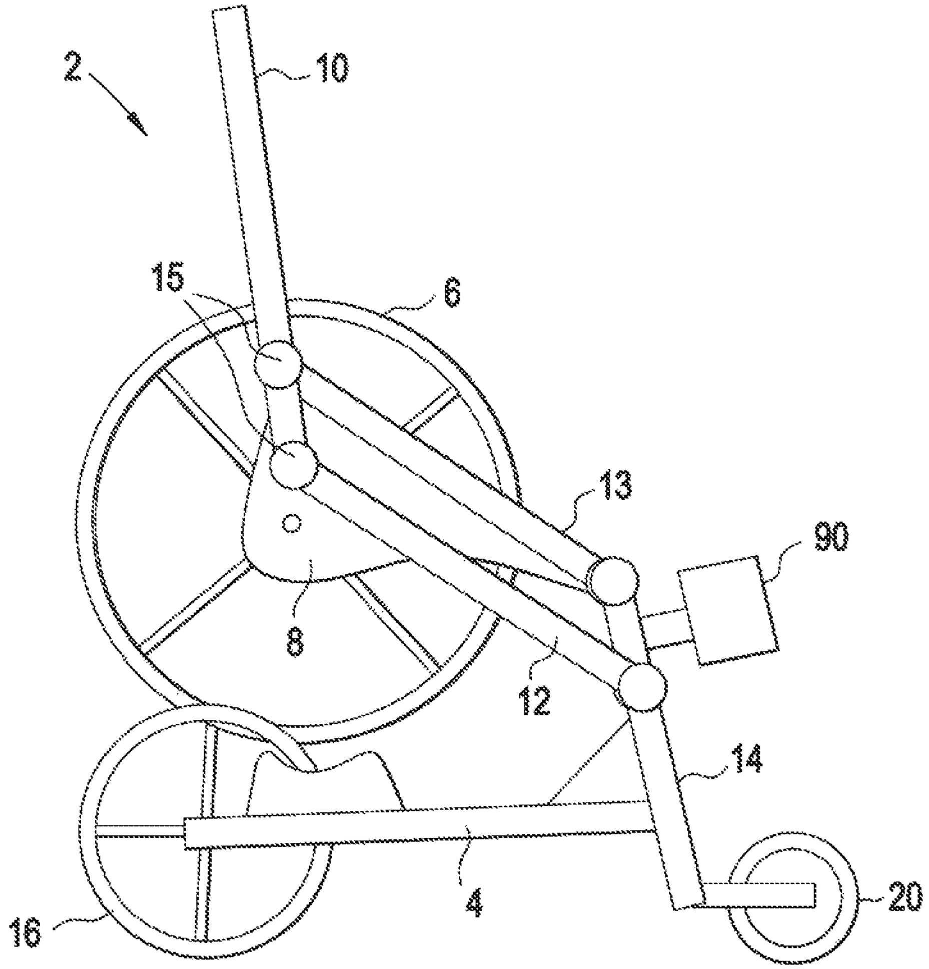
Figure 6C:
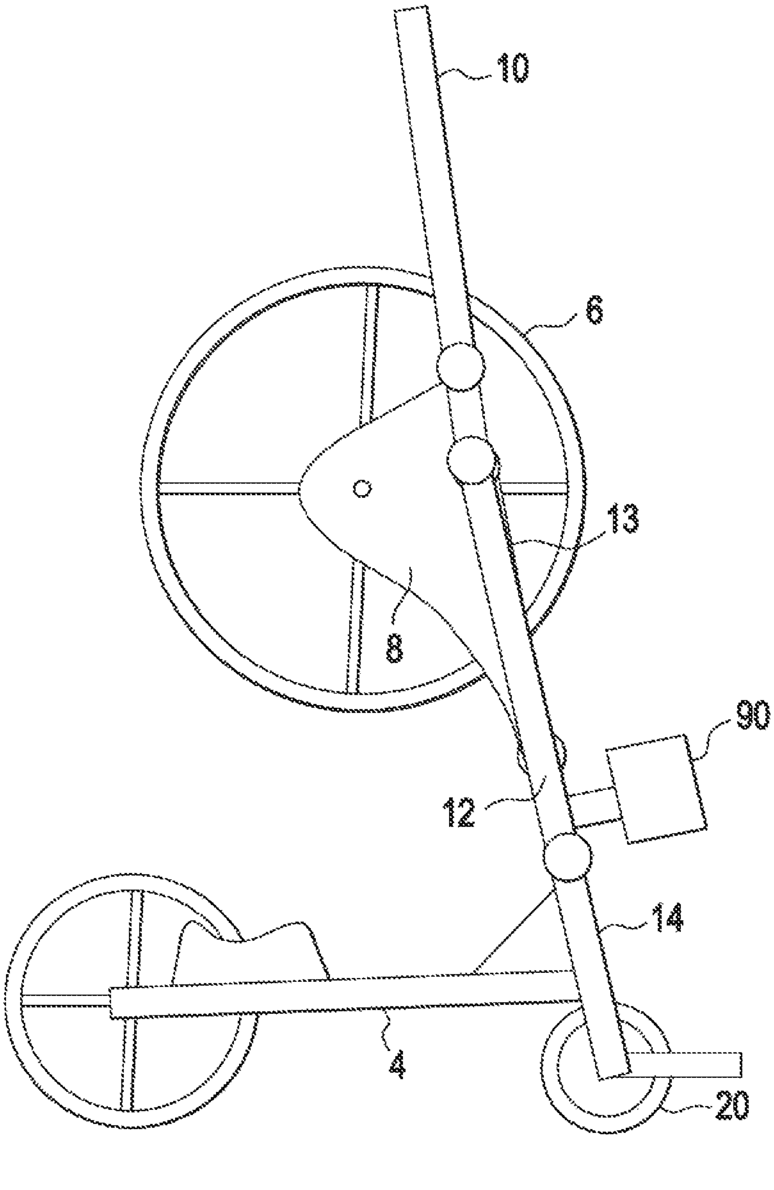

Thus, as seen in the above-mentioned figures, as well as in figures described hereafter, are each of the above components which are discussed in greater detail below. A central part of the present invention is wheelchair frame or chassis 4, and situated on the chassis is convertible user support section system 11 that allows wheelchair 2 to easily transition between seated and standing positions, as well as positions between each of those terminal positions, known herein as "a transition". As seen in FIGS. 6A-6C and in the figures described hereafter, the trunk and the lower part of the legs (shanks or lower extremities) of a user can maintain roughly the same orientation with respect to each other, as the chair transitions between the seated and standing positions. During any transition, the upper part of the legs (thighs) of the user rotate while staying connected to the user's trunk and lower legs through the user's hip and knee joints, respectively, the aforementioned user body portions being supported by convertible user support section 11 of the inventive standing wheelchair. To this end, convertible user support section llcomprises seat back or back support section 10 (which supports the trunk of a user), a seat bottom or seat support section 13 (which supports the buttocks and thighs of a user), and leg rests or lower extremity support structure 14 (supporting the shanks or lower extremities of a user), each of which is hingably connected in turn through each other by use of simple hinge joints 15.

Figure 5:
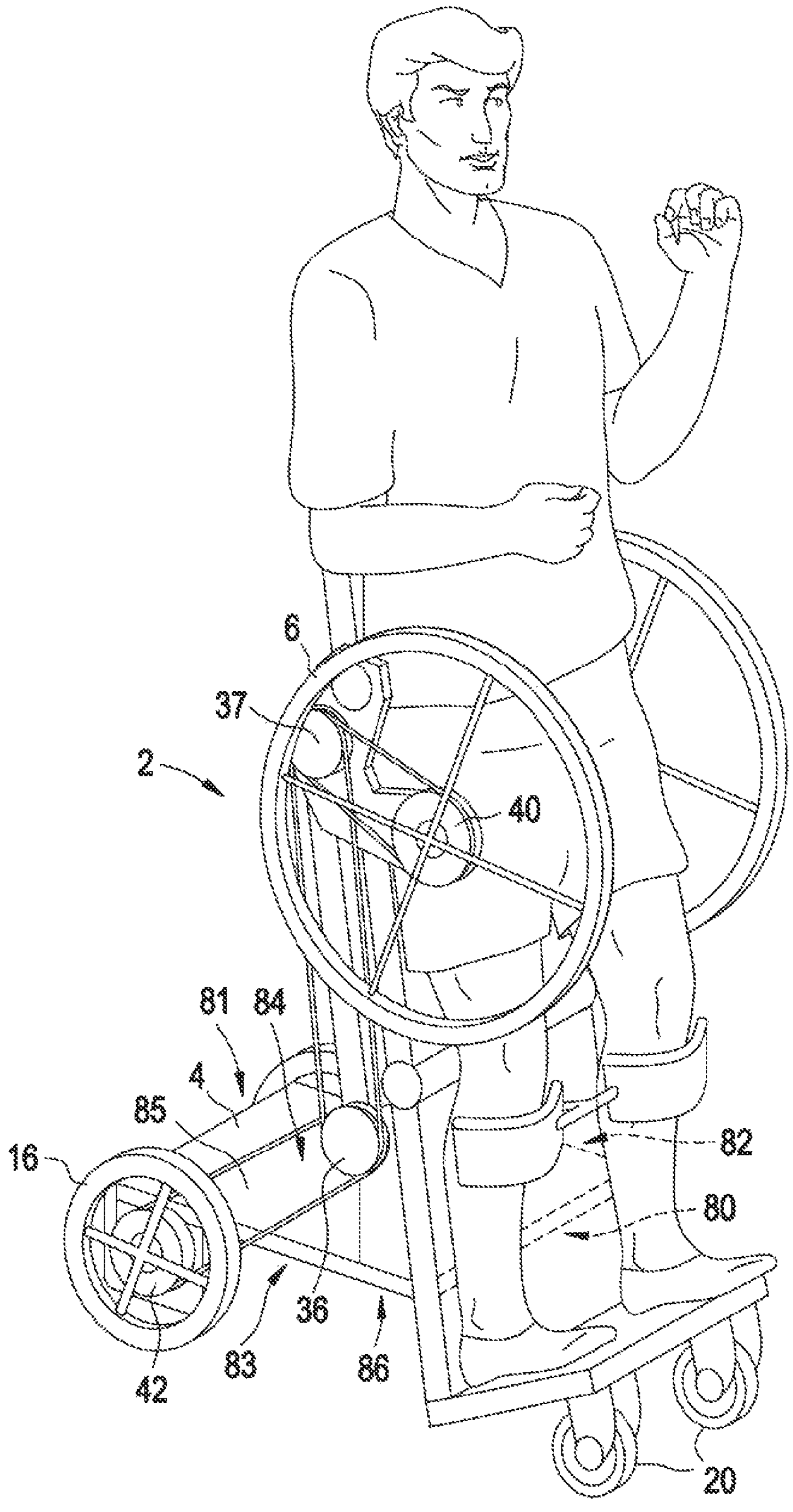
FIG. 5 is an offset view of one embodiment (having two independent intermediate drums) of the standing wheelchair when fully extended in the standing position according to the present invention, with a user illustratively standing thereon.

Furthermore, as generally illustratively seen in FIGS. 6A-6C and elsewhere, with additional illustrative specific reference to FIG. 5 a four segment linkage system may also be provided wherein lower extremity support section 14, seat support section 13, and back support section 10, each of which may be termed a segment linkage, or alternatively, a linkage bar, given. that in one embodiment, each may each be provided with linkage bars at the side edges of ˉthe platform surface of each, so as to interface (e.g., hingably connect) with each other proximally at hinges 15, and so as to extend in a distal fashion in order to provide the support for the overall framework of the respective platforms in each given segment. Further included in the four segment linkage system is an anti-rotation link 12 which may be thought of as a supplemental linkage bar that can be connected between lower extremity support section 14 and back support section 10 so as to create a linkage with each of the aforementioned linkage bars, such that back support section 10 and seat support section 13 members will translate, but not rotate, with respect to one another during a transition. .in order to provide this anti-rotation feature, anti-rotation link 12 should be chosen to be approximately equal in length to the linkage bar of seat support section 13 and is arranged in parallel with the linkage bar of seat support section 13, along a respective long axis of each. Also, optional provision may be made for lower extremity support structure 14 to further include at least one securing bracket 90 for securement of lower extremities (of a user) back against the lower extremity support structure, wherein the securing bracket 90 for securement of lower extremities is affixed to lower extremity support structure 14 and may further include two curved inward facing cushion pieces or the like for the further securement of the lower extremities of a user during a transition, The occupant is therefore secured to standing wheelchair 2 at least at the lower extremities and optionally, higher up by use of a securing feature (not depicted) in order to prevent falling out of the chair while standing, and so as to assist in maintaining correct posture in the standing position.

Figure 7A:
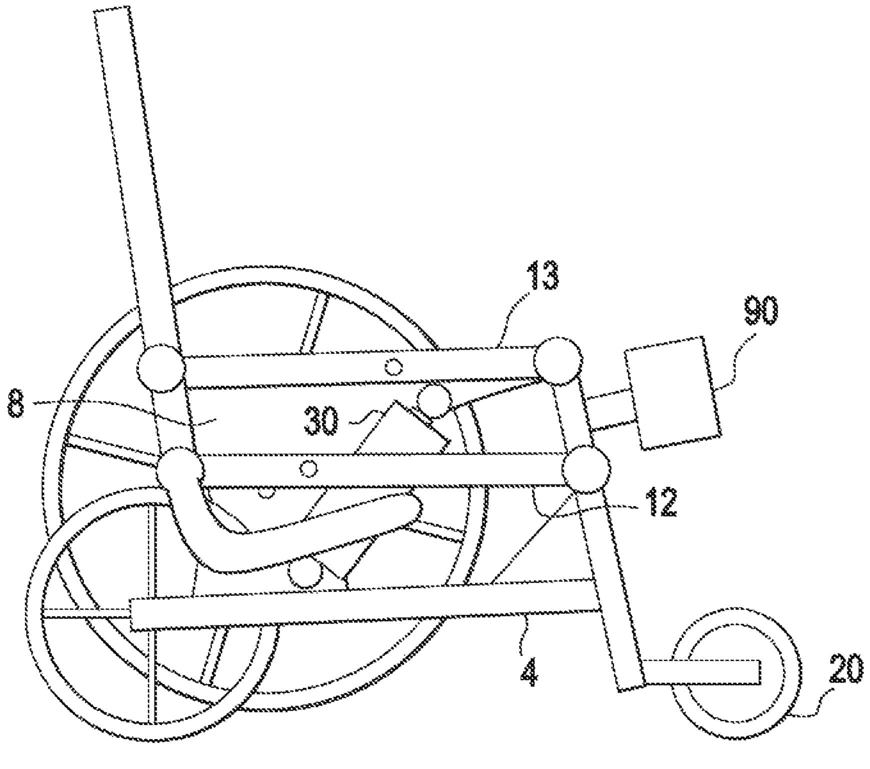
FIGS. 7A-7C is a side view of one embodiment (showing only one-half or one side of the multiplicity of wheels and associated support structure thereof) of the standing wheelchair with one version of the ground drive wheel, anti-rotation link, and user propulsion wheel support structure, and including an illustrative actuator having a pin and handle for changing positions, across various positions according to the present invention.
Figure 7B:
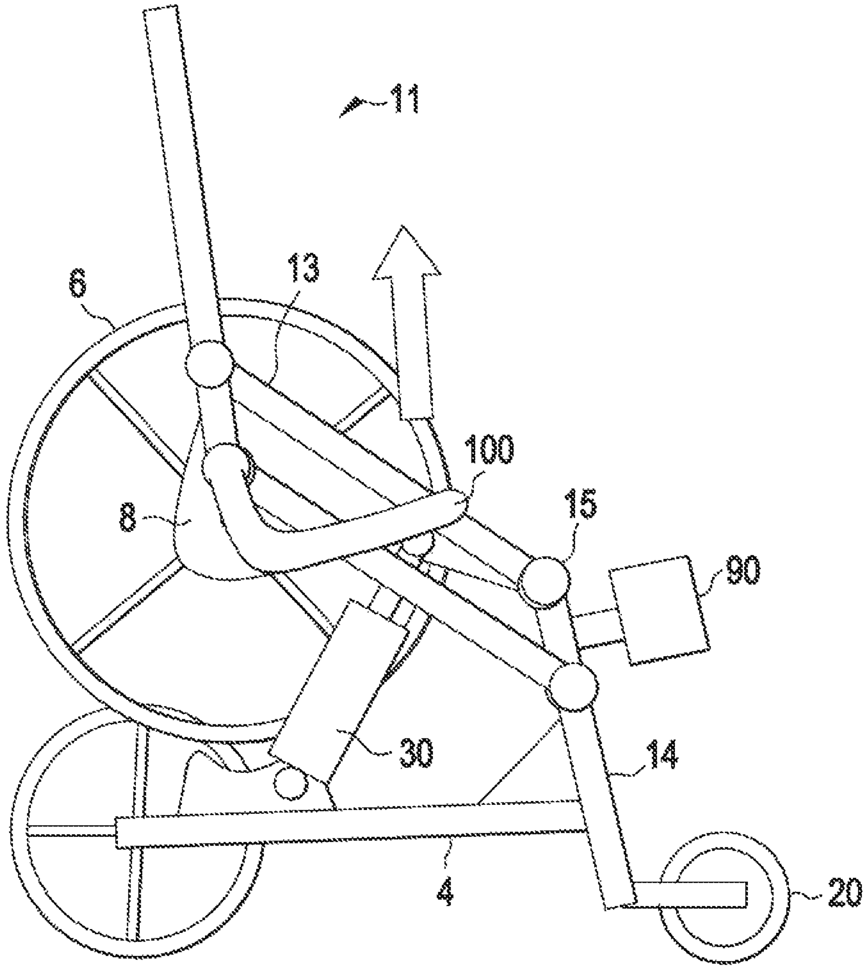
Figure 7C:
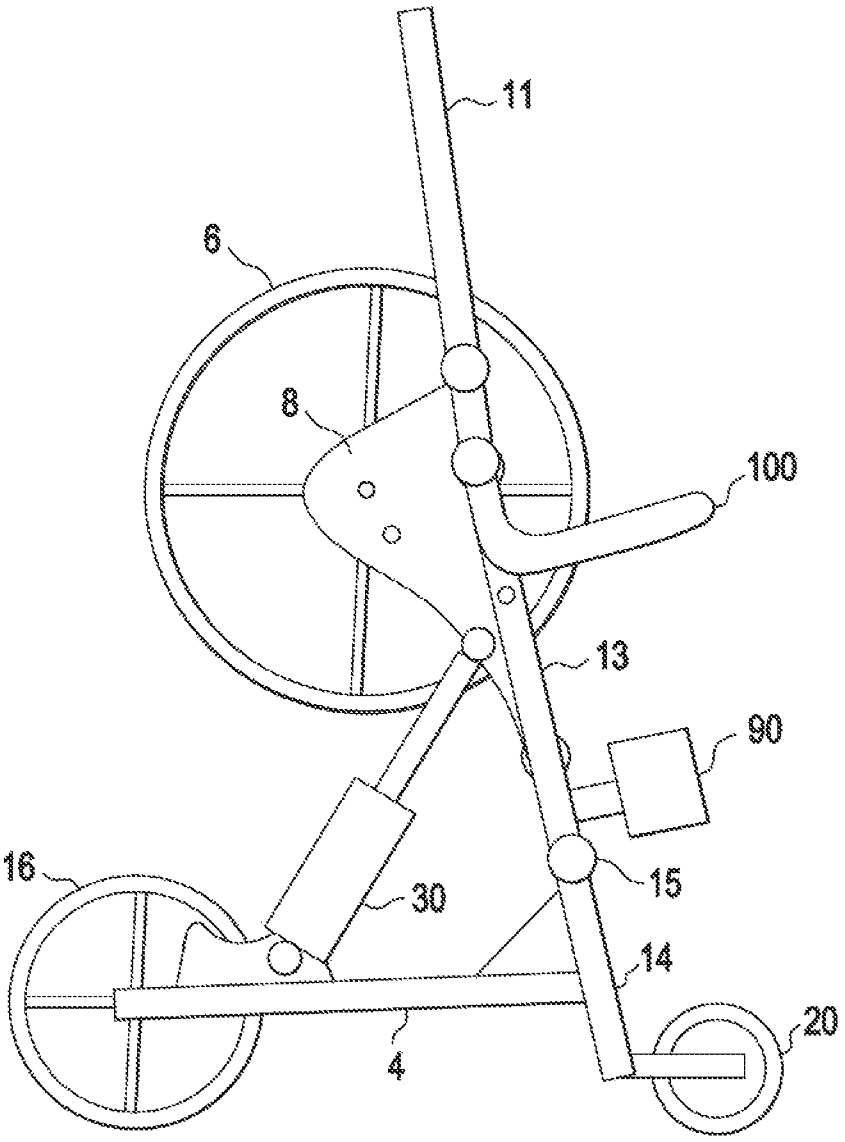
Figure 11A:
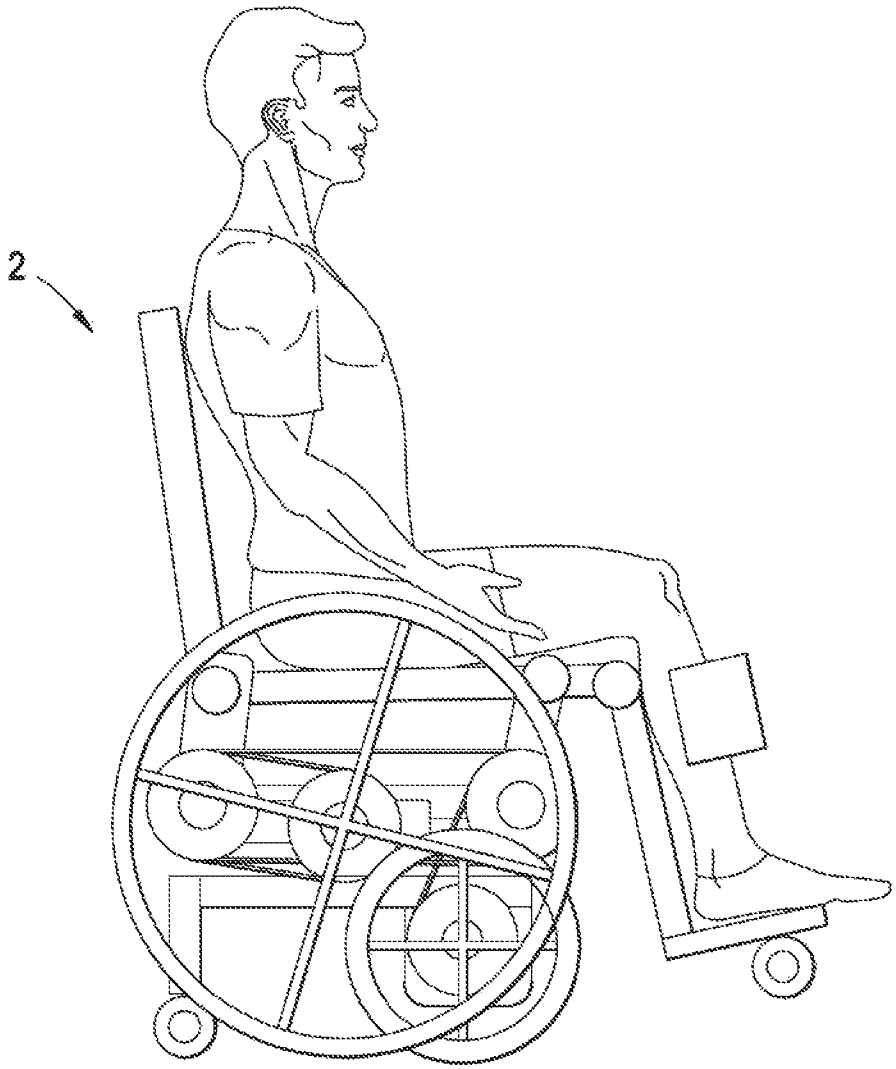
FIGS. 11A-11C depict a side view of one embodiment (showing only one-half or one side of the multiplicity of wheels and associated support structure thereof) of the standing wheelchair with an alternate version of the ground drive wheel, anti-rotation link, actuator, user propulsion wheel support structure, and an alternate variant of the a drive linkage system of the drive system, having at least two independent intermediate drums, across various positions according to the present invention, as illustratively used by a user.
Figure 11B:
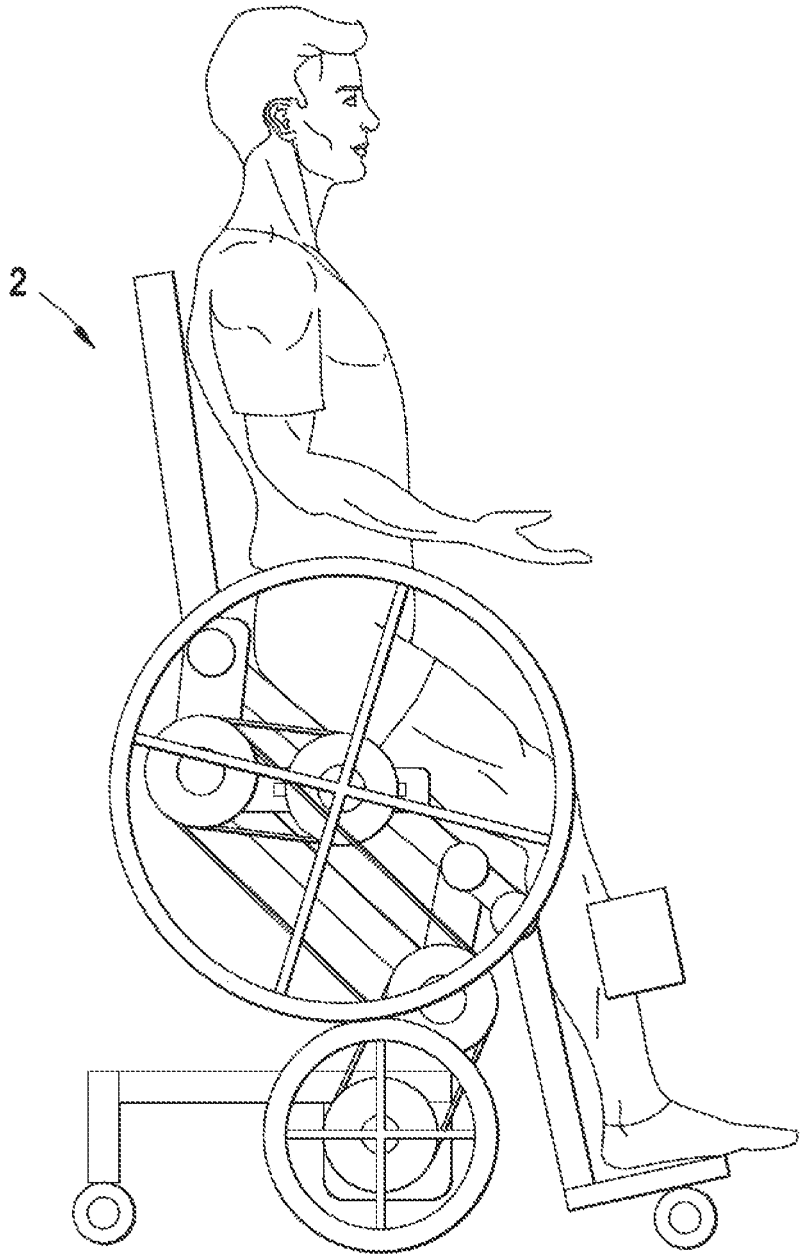
Figure 11C:
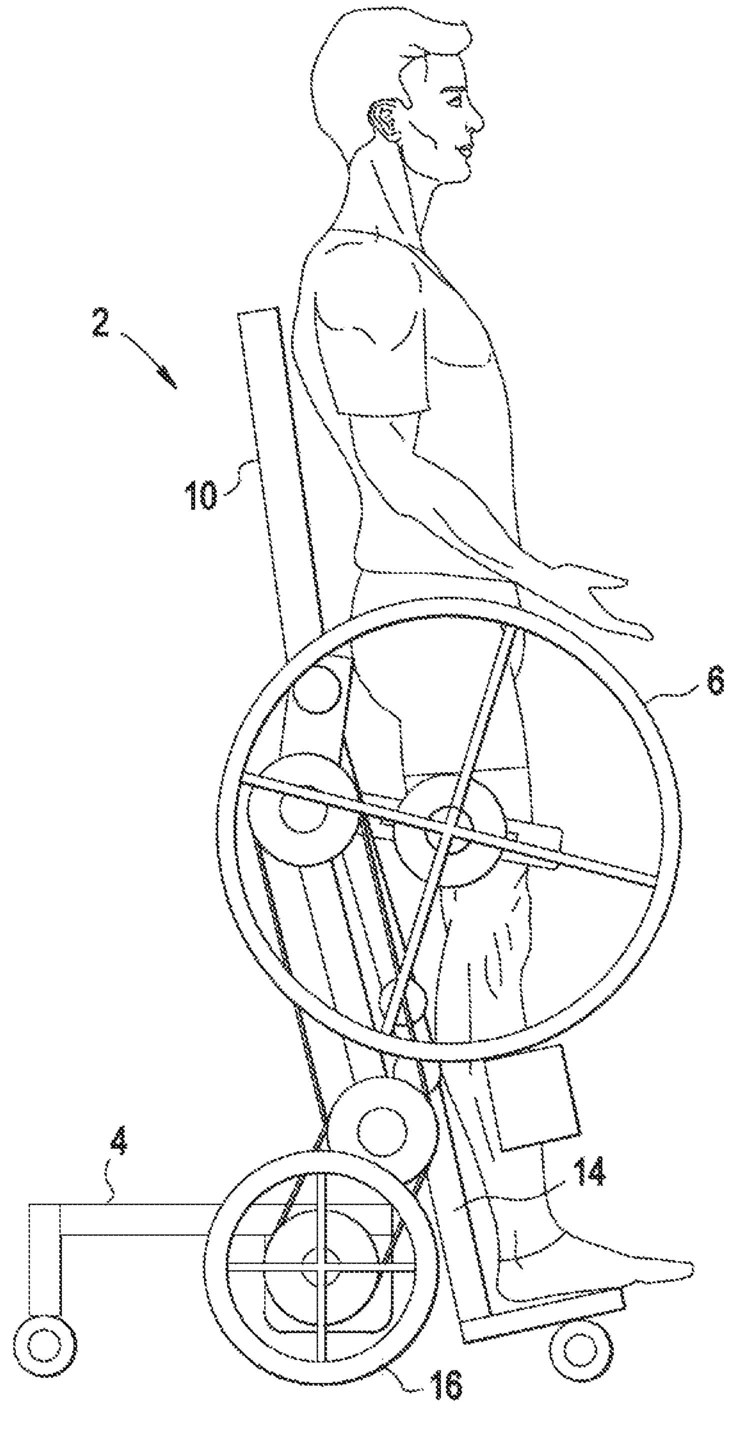

In order to assist in any transition, or more specifically, the transition between a seated position and a standing position, and back thereto, a lift assistance mechanism or adjustment actuator 30 may be employed on the convertible user support section. Adjustment actuator 30 may take many different forms, but in one illustrative embodiment, may comprise the use of devices such as commercially available gas springs that can be readily employed to assist in the transition between the seated and standing positions, and virtually any position therebetween. As seen in FIGS. 7A-7C, one illustrative embodiment may be provided for use of a position changing handle 24 to engage the actuation of adjustment actuator 30 so as to allow the transition of the inventive system, as well as for holding convertible user support section 11 in a particular position, and further to this point, pin 26 or the like may optionally be provided for arresting the same more securely. In one advanced illustrative embodiment, provision may even be made for use of a remote release gas spring that allows the transition of the inventive system to be held in a particular position using a remote release mechanism (not depicted), but which may be described as a remote release gas springs with a ball joint fitting as known in the art of gas springs. To this end, adjustment actuator 30 has a bottom end and a top end, and may be hingably affixed at the bottom end, to the top portion of wheelchair chassis 4, and can be hingably affixed at the top end, to convertible user support section 11, more preferably hingably affixed at seat support section 13, as illustratively shown in FIGS. 7A-7C, or alternatively, may be affixed elsewhere between hinges 15 of the four bar linkage system (not depicted). As can be appreciated, alternative variants of actuator adjustment 30 may be provided for, such as through flexible portions or springs, etc., as generally shown in FIGS. 11A-11C.

Figure 7D:
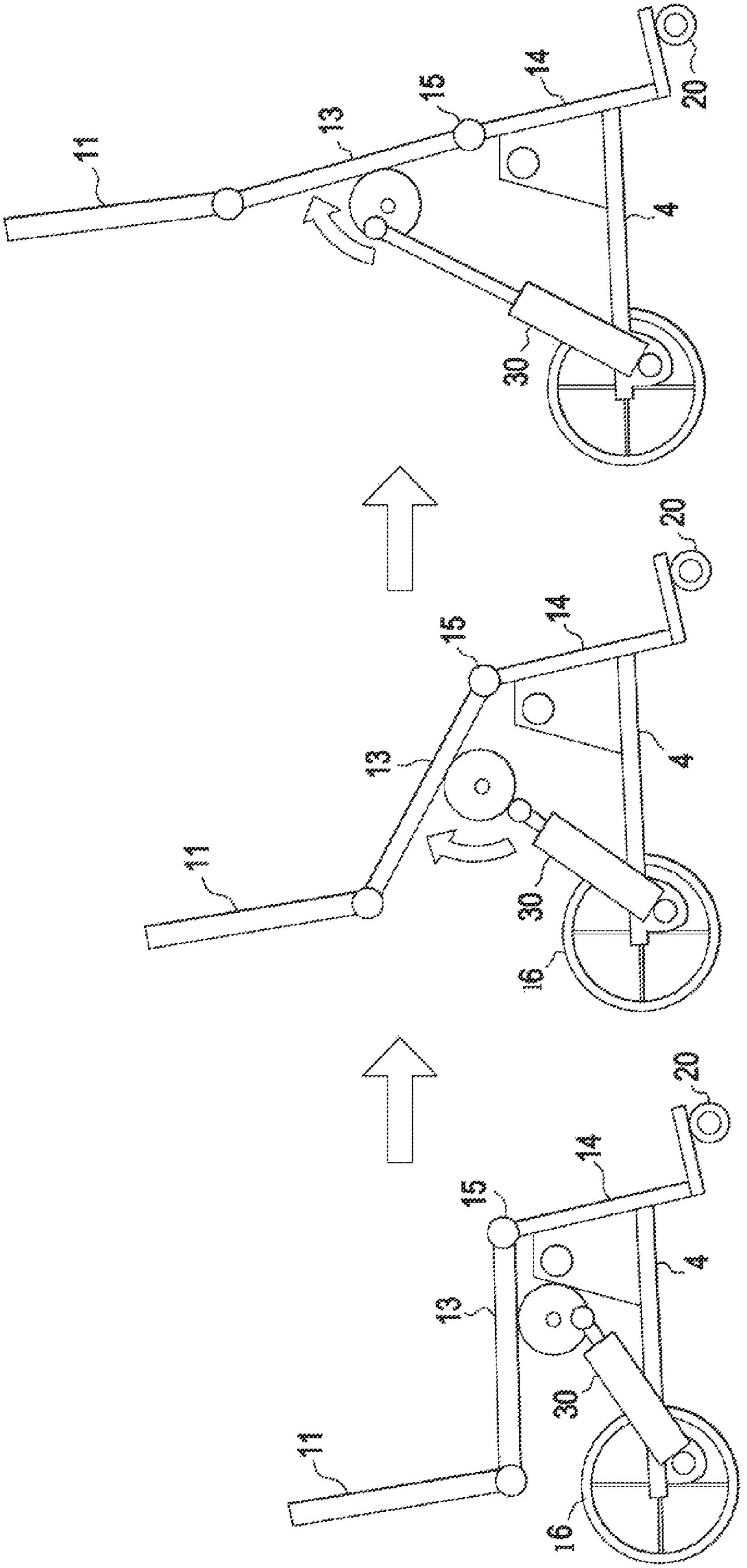
FIG. 7D is a side view of one embodiment of the standing wheelchair with one version of use of a rotating pulley wheels that connect to bracket under the linkage bars of seat support section through a center of each linkage bar, and which connect to illustrative gas springs on their outer rims.

To this end, adjustment actuator 30 may, in one alternative embodiment, also involve the use rotating pulley wheels that connect to bracket 8 under the linkage bars of seat support section 13 through a center of each linkage bar, and which connect to the illustrative gas springs on their outer rims, as seen in FIG. 7D. Provision of such pulleys may be useful in that rotation of these pulleys can change the effective moment arm of the gas springs, thereby making them more effective for lifting the body of a user into the standing position. Typically, such pulleys will have mechanical limits allowing a range of motion of about 30 degrees. At one of these limits, the gas springs can connect to the bottom of the pulley, providing a negligible moment arm with respect to seat support section 13/lower extremity support structure 14 pivot joint(s) 15. As the pulley is rotated forward, the end of the gas spring will rotate backward and upward, creating a larger moment arm with respect to seat support section 13/lower extremity support structure 14 pivot joint(s) 15. Increasing the moment arm of the gas spring will cause the transition to the standing position. Rotation of the pulleys is accomplished through a rotation switch 100, which initiates rotation of the pulleys through known pulley initiators, such as movement of a lever, or from rotation of the push rims of propulsion wheel 6. In some applications, it may be preferable to provide for the use the push rims of the Wheelchair for this task, but such provision will require the use of a standard clutch mechanism (not depicted) to switch power from the push rims of propulsion wheel 6 between the raise pulleys and the drive mechanism.

Figure 8A:
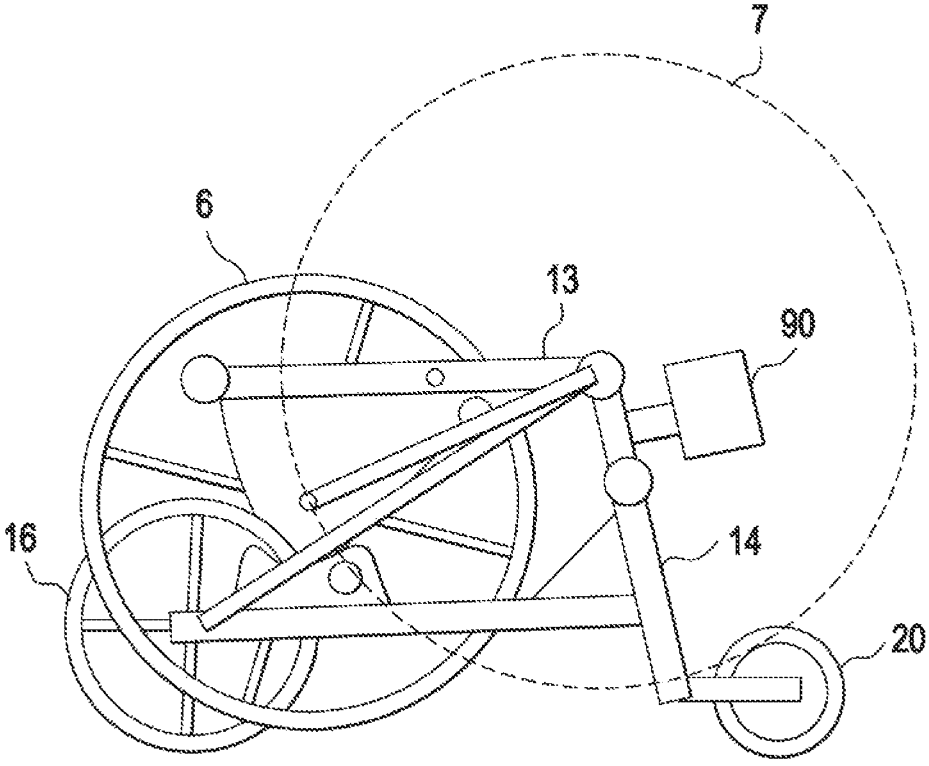
FIGS. 8A-8C is a side view of one embodiment (showing only one-half or one side of the multiplicity of wheels and associated support structure thereof) of the standing wheelchair with one version of the ground drive wheel, anti-rotation link, and user propulsion wheel support structure, and specifically depicting an illustrative range of motion, shown by a theoretical radius of rotation that would provide the user with a constant reach across various positions according to the present invention.
Figure 8B:
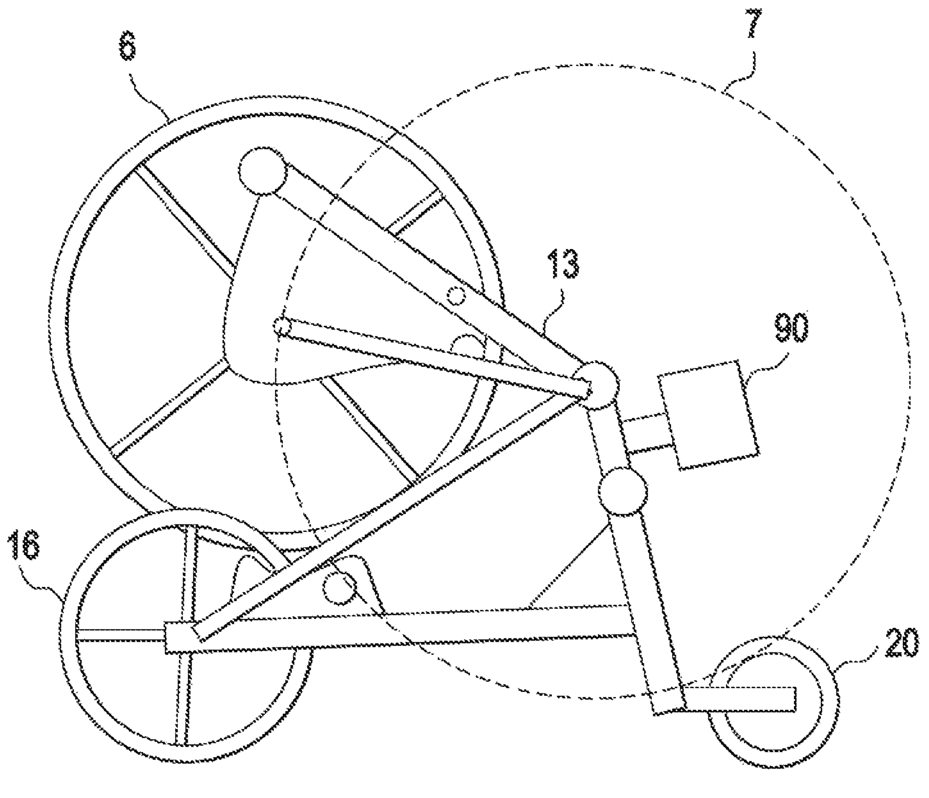
Figure 8C:
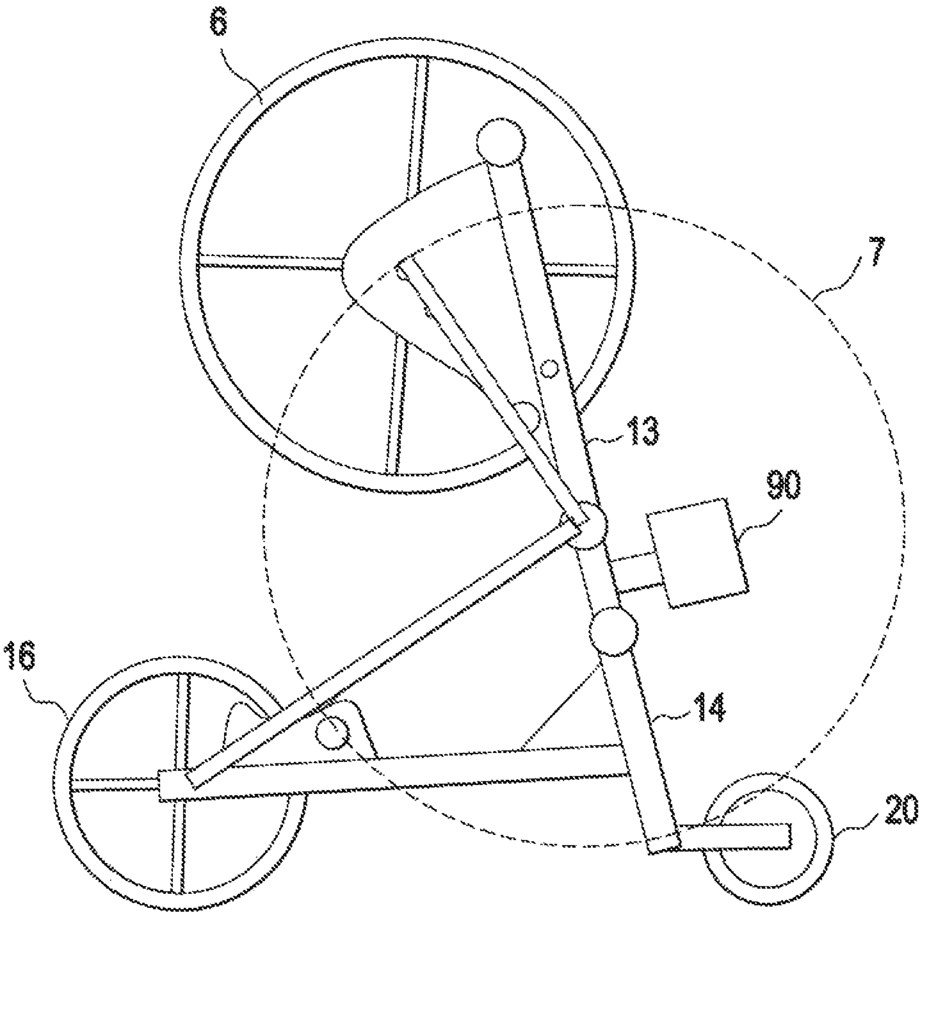
Figure 9:
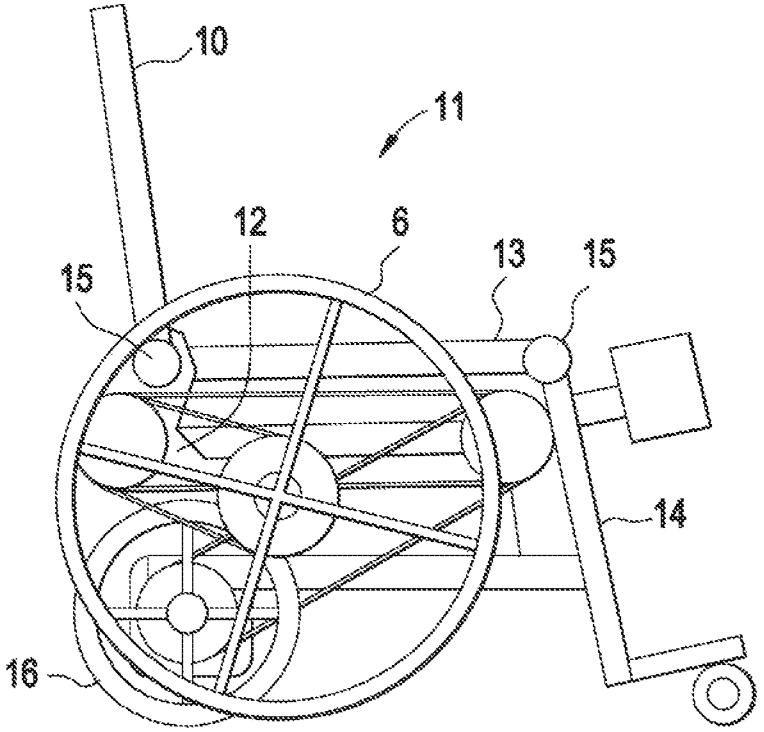
FIG. 9 is a side view of one embodiment, showing exemplary sprockets or drums that might be employed in the standing wheelchair.
Figure 10A:
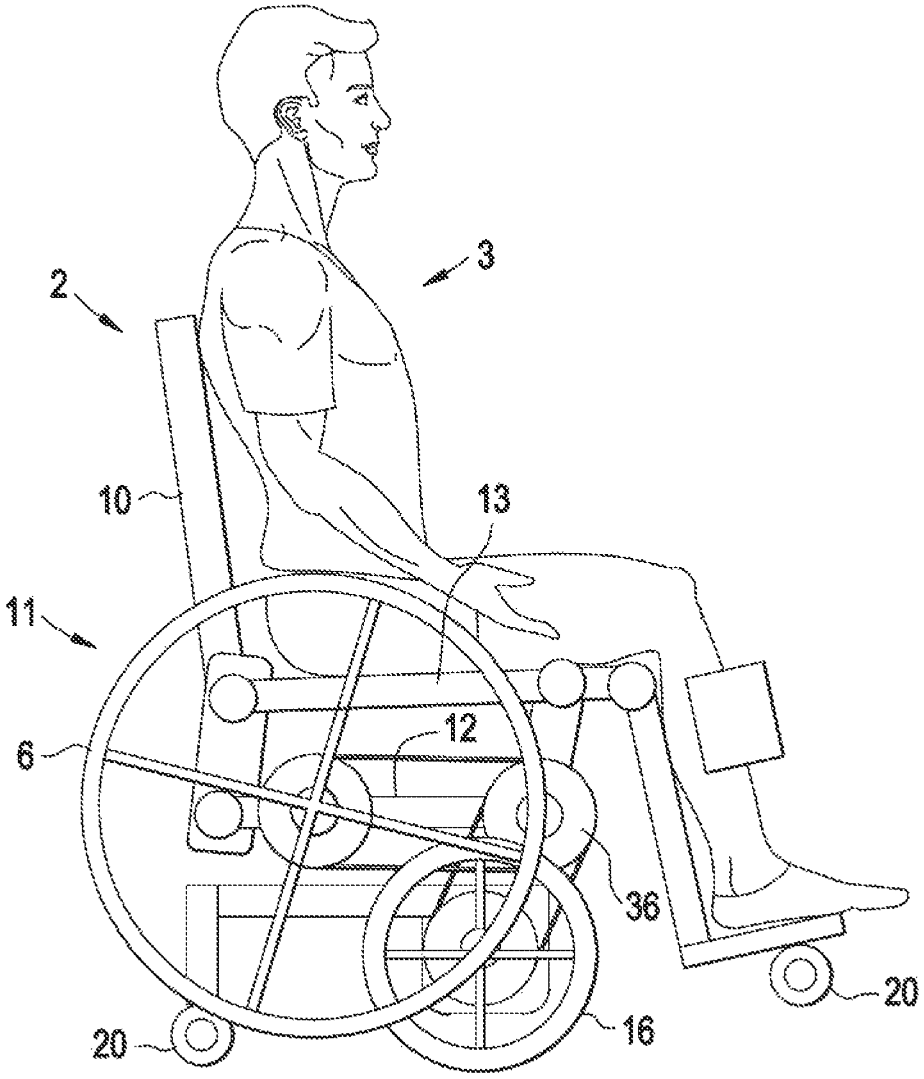
FIGS. 10A-10C depict a side view of one embodiment (showing only one-half or one side of the multiplicity of wheels and associated support structure thereof) of the standing wheelchair with an alternate version of the ground drive wheel, anti-rotation link, actuator, user propulsion wheel support structure, and an alternate variant of the a drive linkage system of the drive system, having at least one independent intermediate drum, across various positions according to the present invention, as illustratively used by a user.
Figure 10B:
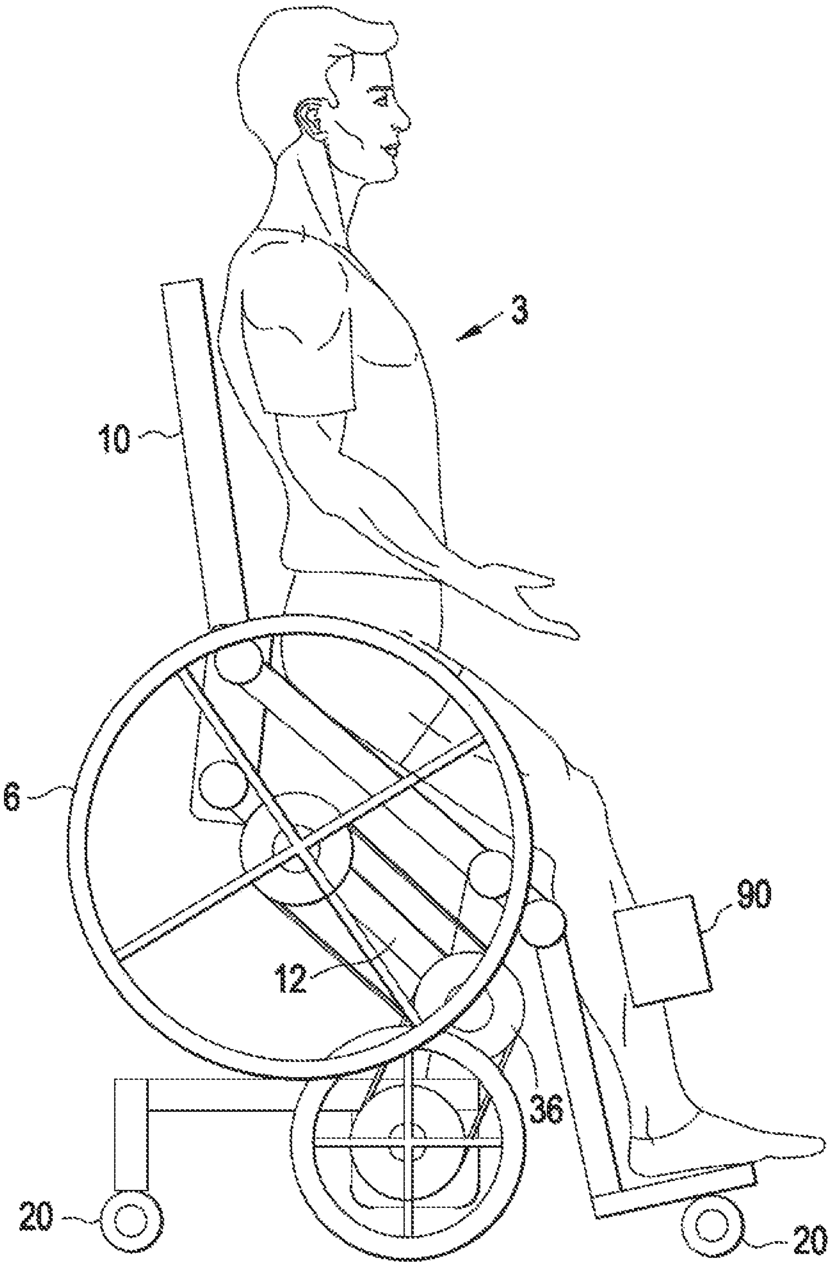
Figure 10C:
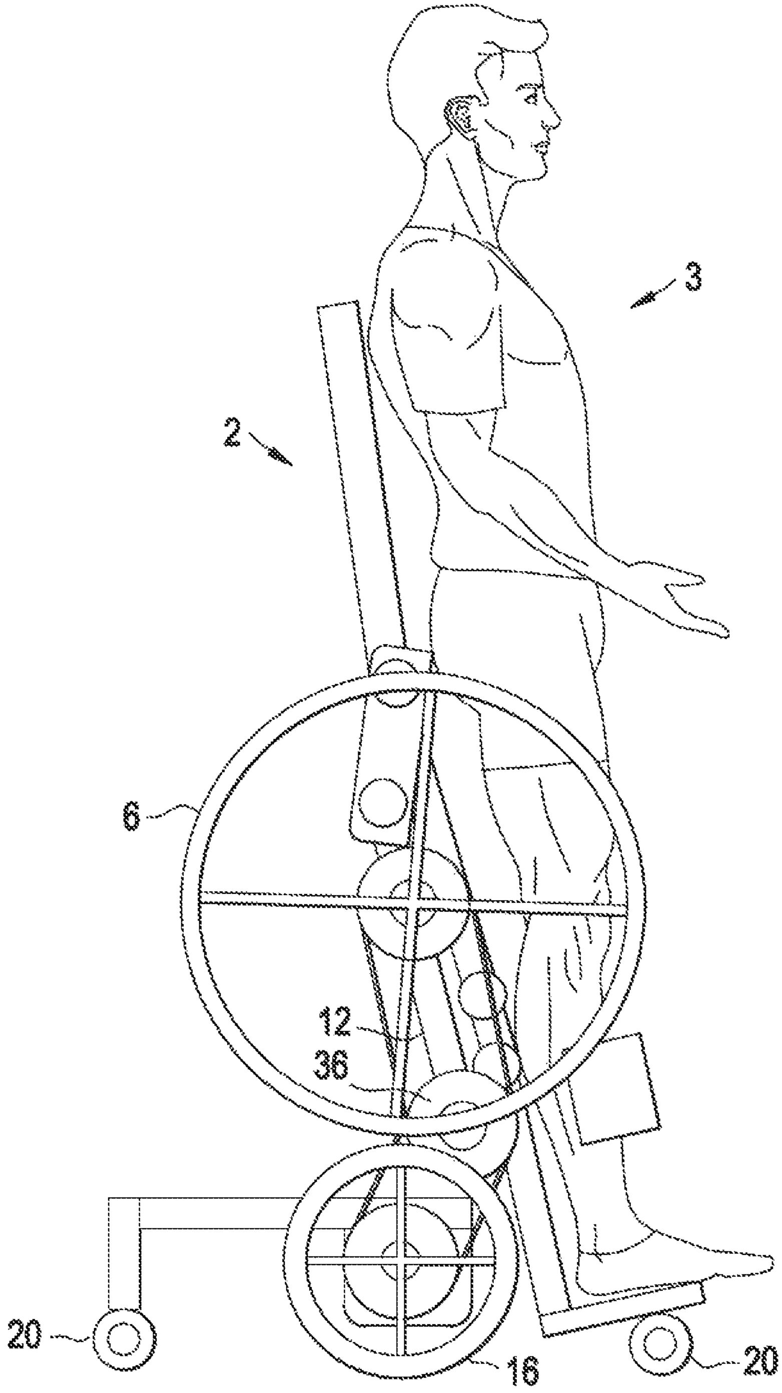

A significant feature of the inventive mobile manual standing wheelchair 2 is the fact that, in addition to being movable in the standing position, it can also offer the distinct advantage of permitting user 3 to propel wheelchair 2 manually through standard pushing of the rim(s) of user propulsion wheel(s) 6, This not only offers the benefit of allowing the user to propel wheelchair 2 by pushing the rims of the main wheels (e.g., user propulsion wheels 6) in a way in which they are accustomed to already, hut the invention features drive system 50 wherein user propulsion wheels 6 can be used to move wheelchair 2 in either seated or standing positions at approximately the same user arm reach and arm positioning along a radius 7 as seen in FIGS. 8A-8C. In order to provide this, FIGS. 1-5 and, with specific reference now to FIG. 4 showing that drive system 50 provides for the user propulsion wheels 6 to be rotably affixed to user propulsion wheel support structure 8, which is in turn affixed to convertible user support section 11, and for ground drive wheels 16 to be functionally connected to user propulsion wheel 6 through a system of cooperatively engaged pulley drums (which include independent intermediate drums 36, 37, as well as cooperating concentrically mounted ground drive drum 42 and concentrically mounted propulsion drum 40) and links or belts 51, 54, 56 (also termed links for connecting multiplicity of wheels 16) so that user propulsion wheel 6 can maintain the aforementioned constant user arm reach and length positioning, regardless of the particular transition or position of convertible user support section 11. To this end, the inventive drive system has a matching left side drive system and a matching right side drive system (not specifically depicted), with the left side drive system being functionally situated on the left side of the chassis, and the right side drive system being functionally situated. on the right side of chassis 4. The left side drive system and the matching right side drive system each have on their respective sides, a corresponding multiplicity of wheels comprising at least: (i) ground drive wheel 16 with concentrically mounted ground drive drum 42 therewith, wherein ground drive wheel 16 is rotably affixed to chassis 4; (ii) and user propulsion wheel 6 with a concentrically mounted propulsion drum 40 therewith, whereby propulsion wheel 6 is rotably affixed to user propulsion wheel support structure 8. The left side drive system and the matching right side drive system of the drive system each also have a corresponding drive linkage system 52 for operatively connecting ground drive wheel 16 with user propulsion wheel 6. In doing so, the drive linkage system 52 on each side has at least one independent intermediate drum 36, 37 for providing a rotable hub between concentrically mounted ground drive drum 42 of ground drive wheel 16 and concentrically mounted propulsion drum 40 of the user propulsion wheel 6. Links or belts 51, 54, 56 are provided connecting, in a cooperative drive fashion, between the multiplicity of wheels (e.g., ground drive wheel 16 and the user propulsion wheel 6) via at least one independent intermediate drum 36, 37. Independent intermediate drum(s) 36, 37 is a (are) drum(s) that is (are) "independent" of concentric affixment to ground drive wheel 16 and user propulsion wheel 6, but which act interconnectedly therewith as a pulley wheel (e.g., when belts are used) or sprocket (e.g., when chains are used), and therefore provides for the directional transfer of the angular moment of power from the user pushing the rims of user propulsion wheel 6 to ground drive wheel 16, regardless of the exact location of user propulsion wheel 6 in relation to ground drive wheel 16 that may result from any given transition of convertible user support section 11. In one embodiment with one independent intermediate drum 36, the independent intermediate drum is affixed to anti-rotation link 12, as illustratively depicted generally FIGS. 10A-10C. However, it is noted that, in one embodiment, provision of two independent intermediate drums 36, 37 between ground drive wheel 16 and user propulsion wheel 6 offer far more transition possibilities, namely virtually unlimited intermediate positions between the standing and seated positions, especially when user propulsion wheel 6 is rotably affixed to user propulsion wheel support structure 8, as illustratively seen in FIGS. 11A and 11C. In such a case, a first, or lower independent intermediate drum 36 is provided, and may be rotably affixed in proximity to hinge 15 connecting seat support section 13 and the lower extremity support section 14, and in one embodiment, will be affixed specifically to a first end of anti rotation link 12, near hinge 15, as seen, for example, in FIGS. 4 and 11C. Conversely, a second or upper independent intermediate drum 37 is provided, and may be rotably affixed in proximity to hinge 15 connecting seat support section 13 and back support section 10, and in one embodiment, will be affixed specifically to a second end of anti rotation link 12, near hinge 15, or elsewhere closer to any separate hinges on anti rotation link 12, as depicted in FIG. 9A.

The above referenced components of the drive system are respectively connected together by chains or belts, as depicted in the above-referenced figures. In one embodiment, a belt drive system may be employed instead of a chain drive system, in order to reduce the noise inherent in metallic chain based systems. In such a case, the sheave of belts 51, 54, 56 may be smooth (devoid of discrete interlocking members as would commonly be found on systems involving a chain sprocket, spur gear, or timing belt), or may be fixed by the ratio of teeth on a drum or pulley, as with gears or sprocket based systems. In this embodiment, three bells or chains 51, 54, 56 will be used (per side) with two single-strand sprockets or drums 40, 42 and two double-strand sprockets or drums (independent intermediate drums 36, 37) as depicted illustratively in FIG. 4 and elsewhere. The first belt 56 will connect a single strand sprocket or drum (concentrically mounted propulsion drum 40) on user propulsion wheel 6 to a doublestrand sprocket (independent intermediate drum 37) located, in some cases, proximate to anti rotation link 12. A second belt 54 will go between two doable-strand sprockets or drums (independent intermediate drums 36, 37) such that, in one embodiment, the two double-strand sprockets or drums (independent intermediate drums 36, 37) may respectively be situated on or proximate to the two (pivot) ends of anti-rotation link 12. Lastly, a third belt 51 will go between the double-strand sprocket or drum (independent intermediate drum 36) and a single-strand sprocket or drum (concentrically mounted ground drive drum 42) mounted on ground drive wheel 16 of wheelchair 2. Figures depicted herein of the three chain or belt system generally show the structure and operation for one side of the wheelchair. However, both sides of the wheelchair will nonetheless have the same three (or in some embodiments, two) belt system for independent control of a respective ground drive wheel 16 by the respective user propulsion wheel 6, thereby allowing full independent movement of the each left and right side, so that the user can rotate (e.g., turn) in the same manner as with a standard wheelchair.

In either case, the challenge of connecting the user propulsion wheels with the ground drive Wheels, whether via a chain or belt, is the change in distance between their respective axles (not depicted) as the Wheelchair transitions from the seated to the standing positions, This change in distance, may in one embodiment, be managed with an appropriately positioned idler sprocket or pulley (as shown in the above referenced figures, and as structurally provided for in the manner discussed above) and/or by using a moving "elbow" type system depicted in, for example, FIG. 4. In such a case, the elbow system will be a generally doglegged, pivoting bracket that is affixed to the structure of wheelchair 2 and will generally not protrude in a posterior direction from the chair, thereby providing the advantage of reduced structural interference when the user maneuvers around neighboring Objects in his environment.

Provision of all of the above ensures that drive system 50 is configured so that user propulsion wheel 6 is maintained in a position so as to be a relatively constant access position to a user, thereby avoiding any real change in the distance between the shoulders of the user and the rims and/or axle of user propulsion wheel 6. This is deemed important in actual use, as changing the distance between the shoulders of the user and the rims or axle of user propulsion wheel 6 is undesirable because the user's shoulders are largely important for wheelchair ambulation, and accordingly, changing this distance may reduce the effectiveness of the user's shoulders in applying appropriate forces to the push rim for propulsion and braking purposes. Further to this point, the user propulsion wheel is therefore, as discussed above, affixed to user propulsion wheel support structure 8, which is in turn affixed to the upper or back end of seat support structure 13, so that the torso of a user is closely aligned with user propulsion wheel support structure 8 whether in seated or standing positions (or therebetween), thereby ensuring that the distance from the shoulders to the axle or rim of user propulsion wheel 6 is more consistent in all positions, as seen in FIGS. 8A-8C, which depicts the theoretical radius of movement of the axle of user propulsion wheel 6 about joint 15 which is located between lower extremity support section 14 and seat support section 13. Thus, each given user propulsion wheel 6 (and the rims associated therewith) are maintained in a position so as to be a relatively constant access position for the user to push or propel user propulsion wheel 6.

Depending on whether the user is traversing an incline, decline, or an unconventional surface, inventive standing wheelchair 2. provides for a gearing system 60 that allows the user to change the gain between the push rims and drive wheels in order to help offset for factors such as incline, added weight, or terrain. Although such gearing could relate to a derailleur system similar to those used on many bicycles, such bicycle gearing mechanisms are designed to transfer torque in one direction only, for example, systems with hubs that "freewheel" when driven in the reverse direction. It is noted that this behavior is not necessarily optimal for a wheelchair because the push rims typically control the wheels in forward and reverse directions, and a "free wheel" system would eliminate the possibility of backwards movement. Similarly, other types of bicycle hubs, such as true "fixed-gear" hubs provide a more direct connection between the bicycle crank and the drive wheel (thereby removing "free-wheel" or "coasting" behaviors), and remove the need for brakes on bicycles, given that the drive wheel can be decelerated by using the lower limbs to resist movement of the crank or propulsion means. However, the rearward or backwards movement is necessarily prevented by the inclusion of this gearing system, too, given that reversing the bicycle crank direction backwards performs a braking effect or other effect that does not permit multi-gear ration propulsion. To this end, a unique bi-directional fixed hub 62 system is provided for in the present invention, which permits the user to push the rims of user propulsion wheel 6 in either a forward or backwards direction in order to achieve respectively, a forwards or backwards propulsion in one of several gear ratios. This hub, can be concentrically mounted (not specifically depicted) on the axle of at least one user propulsion wheel 6 for engaging the drive wheel system at one of several (or as depicted, three) predetermined gear ratios. The bidirectional fixed hub system may further have a user switching means 64, such as a small lever 100 as illustratively shown in FIG. 4, for transitioning between said one of several predetermined gear ratios. Such a system may be selected from the recent advances in bi-directional fixed. hub, three-gear systems for bicycles, such as those available from Sturmey-Archer of Napa, CA, sold under the name S3X™. Such a hub is, in one embodiment, an internal gear hub, meaning the gearing is internal and protected from many environmental elements. In one embodiment, two bi-directional multiple (3-speed) fixed-gear internal hubs are provided, one on each side, concentrically mounted on the user propulsion wheel, and will have sprocket sizes that provide an appropriate gearing for say slow, normal, and fast (backwards and forwards) propulsion of wheelchair 2 in seated and/or standing positions, both hubs being further simultaneously controlled by one switching means in an illustrative embodiment. In implementing this system in the context of the present invention, it is noted that for the standing position, one embodiment may include the option for blocking the fast propulsion speed for safety reasons. In either case, the aforementioned approach should allow the user to move forward, backward, to the side (turning), and to stop, using the push rims of user propulsion wheel 6 in the same manner as a standard wheelchair. Separately, it is further noted that provision may also be made for brakes on the wheelchair which involves levers attached to the frame that push into one or more of the multiplicity of wheels, As such, in one embodiment, connection may be made for brakes on the back support section that will interact with the push rims of user propulsion wheel 6, or alternatively provision maybe made for incorporating the brakes within the transition system as known in the art of bicycle braking, which could mechanically brake drum 50 to the user propulsion wheel support structure 8, or which could effectuate braking between user propulsion Wheel 6 and user propulsion Wheel support structure 8. Intermediate drums 36 or 37 could alternatively have braking mechanisms built-in that could be remotely activated. With such remote activation, drum 42 could also contain the brakes which, in some embodiments may be preferred because wheelchair could still be stopped or held in place with the brakes in case of belt or chain failure due to slippage or breakage.

In an optional embodiment of the present invention, as soon as a transition is made from a seated position to an elevated position, a spring-loaded mechanism may be provided that deploys a pair of anti-tip wheels, not depicted herein, but described in U.S. Pat. Nos. 7,165,778, 7,784,815, each of which are hereby incorporated by reference in their entirety. The anti-tip wheels extend the wheelbase of wheelchair 2, providing a more stable platform for safe operation of wheelchair 2 on smooth, level surfaces. With the pair of anti-tip wheels deployed, wheelchair 2 has six wheels in contact with the ground: a pair of ground drive wheels 16, a pair of front directional wheels 20, and the pair of anti-tip wheels. Advantageously, this plurality of Wheels also can, in one embodiment, be modified so as to limit the operation of the wheelchair on extreme inclines or very rough terrain, Where use of wheelchair 2 may be dangerous for an occupant. In any case, when convertible user support section system 11 is fully raised, the occupant is pulled up and backwards towards the now-elevated convertible user support section system 11. This transition means that the erect, standing position of user 3 and convertible user support section system 11 may accordingly raise up the overall center of gravity of wheelchair 2. However, standing wheelchair 2 features already features a relatively low center of gravity, but when combined with anti-tip wheels, it is nevertheless possible to move or propel. wheelchair 2 in the standing position in an improved fashion on moderately inclined and/or rough surfaces. By way of yet another embodiment, it is noted that as depicted in FIGS. 10A-10C and FIGS. 11A-11C, that the present invention can be modified such that the center of gravity and the locus of the ground drive force can be expressed through an alternate positioning of ground drive wheels 16 towards the center portion 84, rather than rear portion 81, of wheel chair 2. When provisioned as such, ground drive wheels 16 may be rotably affixed towards the (respective) side(s) (e.g., left portion 82, a right portion 83) and center portion 84 of chassis 4, instead of the side of the rear part of chassis 4, as previously discussed. This positioning may offer different stability and drive traction options, especially when provided with an optional set of stabilizing rear wheels that are similar, but structurally opposite of directional wheels 20.

The invention being thus described, it will be evident that the same may be varied in many ways. Such variations are not to be regarded as a departure from the spirit and scope of the invention and all such modifications are intended to be included within the scope of the claims.

What is claimed is:

1. A standing wheelchair comprising:

a chassis having a front portion, a rear portion, a center portion, a left portion, a right portion, a top portion, and a bottom portion;

a lower extremity support structure affixed in a substantially vertical fashion at said front portion of said chassis;

frontal directional support wheels rotatably coupled to said lower extremity support structure;

a convertible user support section affixed to said top portion of said chassis, said convertible user support section comprising at least a seat support section and a back support section, wherein said seat support section and said back support section are hingably connected together;

an adjustment actuator for raising and lowering said convertible user support section between a seated position and a standing position of said wheelchair and any intermediate positions therebetween, wherein said adjustment actuator has a bottom end and a top end and is hingably affixed at said bottom end to said top portion of said chassis, and is hingably affixed at said top end to said convertible user support section;

a user propulsion wheel support structure affixed to said convertible user support section;

a drive system having a matching left side drive system and a matching right side drive system, said left side drive system being functionally situated on said left side of said chassis and a right side drive system being functionally situated on said right side of said chassis;

wherein said left side drive system and said right side drive system each respectively have a corresponding multiplicity of connected drive system wheels comprising at least a ground drive wheel, said ground drive wheel being rotatably coupled to said chassis at said front portion of said chassis, and a user propulsion wheel rotatably affixed to said user propulsion wheel support structure;

wherein said chassis further includes a set of stabilizing rear wheels situated structurally opposite said frontal directional support wheels, and wherein each said ground drive wheel is between said frontal directional support wheels and said stabilizing rear wheels, as a means for maintaining a stable center of gravity of said wheelchair at said front portion and for focusing a center of gravity and a locus of force of said ground drive wheel at said front portion; and wherein said lower extremity support structure and said frontal directional support wheels transition together from an elevated position spaced from the ground when said wheelchair is in said seated position, to a lowered position with said frontal directional support wheels contacting the ground when said wheelchair is in said standing position.

2. The standing wheelchair according to claim 1, wherein each respective said user propulsion wheel of said left side drive system and said matching right side drive system is vertically aligned with each respective said ground drive wheel of said left side drive system and said matching right side drive when said standing wheelchair is extended in said standing position.

3. The standing wheelchair according to claim 2, wherein said drive system includes at least one independent intermediate drum and wherein said multiplicity of connected drive system wheels are connected with said at least one independent intermediate drum together in a cooperative drive fashion through a linkage selected from the group consisting of chains, smooth sheaved belts, and toothed belts.

4. The standing wheelchair according to claim 3, further including a bi-directional fixed gear hub system, concentrically mounted on said user propulsion wheel, for engaging said drive wheel system at least one predetermined gear ratio, said bi-directional fixed gear hub system providing both forward and reverse propulsion and braking when said user propulsion wheel is pushed in either a forward or backwards direction.

5. The standing wheelchair according to claim 4, said lower extremity support structure further including a securing bracket for securement of lower extremities back against said lower extremity support structure, said securing bracket for securement of lower extremities being affixed to said lower extremity support structure and further including two curved cushion pieces for further securement of lower extremities during a transition.

6. The standing wheelchair according to claim 5, wherein said drive system is adjustable so that rims of each said user propulsion wheel on said left portion and on said right portion of said chassis are configured to retain alignment of user shoulders and positioning of user arms, when said standing wheelchair is in either said seated position or said standing position.

7. The standing wheelchair according to claim 5, wherein said bi-directional fixed hub system further includes an option for blocking fast propulsion when said standing wheelchair is in said standing position, and wherein said standing wheelchair further includes brakes.

8. A standing wheelchair comprising:

a chassis having a front portion, a rear portion, a left portion, a right portion, a top portion, and a bottom portion;

a lower extremity support structure affixed at said front portion of said chassis;

frontal directional support wheels rotatably coupled to said lower extremity support structure;

a convertible user support section affixed to said top portion of said chassis, said convertible user support section comprising at least a seat support section and a back support section, wherein said seat support section and said back support section are hingably connected together;

a manual propulsion drive system having a matching left side drive system and a matching right side drive system, said left side drive system being functionally situated on said left side of said chassis and a right side drive system being functionally situated on said right side of said chassis;

wherein said left side drive system and said right side drive system each respectively have:

at least one independent intermediate drum; and a corresponding multiplicity of connected drive system wheels comprising at least:

a ground drive wheel, said ground drive wheel being rotatably coupled to said chassis at said front portion of said chassis; and a user propulsion wheel;

wherein said multiplicity of connected drive system wheels are connected with said at least one independent intermediate drum together in a cooperative drive fashion through linkages;

wherein said chassis further includes a set of stabilizing rear wheels situated structurally opposite said frontal directional support wheels, and wherein each said ground drive wheel is between said frontal directional support wheels and said stabilizing rear wheels; and wherein said lower extremity support structure and said frontal directional support wheels transition together from an elevated position spaced from the ground when said wheelchair is in said seated position, to a lowered position with said frontal directional support wheels contacting the ground when said wheelchair is in said standing position.

9. The standing wheelchair according to claim 8, wherein said linkages are selected from the group consisting of chains, smooth sheaved belts, and toothed belts.

10. The standing wheelchair according to claim 9, wherein said independent intermediate drum is selected from the group consisting of idler sprockets, pulleys, and elbow systems.

* * * * *